United States Patent [19]

Johnson et al.

[11] 4,273,792

[45] Jun. 16, 1981

[54] BANANA PROCESSING

[75] Inventors: William P. Johnson, Queratate, Mexico; Elton H. Harter, San Jose, Costa Rica

[73] Assignee: Gerber Products Company, Fremont, Mich.

[21] Appl. No.: 124,152

[22] Filed: Feb. 25, 1980

Related U.S. Application Data

[63] Continuation of Ser. No. 958,752, Nov. 8, 1978, abandoned.

[51] Int. Cl.³ ............................................. A23L 1/212
[52] U.S. Cl. .................................. 426/482; 426/484; 426/510
[58] Field of Search ............... 426/615, 510, 511, 801, 426/482, 483, 518, 268, 419, 447, 484

[56] References Cited

U.S. PATENT DOCUMENTS

| | | | |
|---|---|---|---|
| 2,278,469 | 4/1942 | Musher | 426/447 |
| 2,741,560 | 4/1956 | Reale | 426/511 |

*Primary Examiner*—Joseph M. Golian
*Assistant Examiner*—George C. Yeung

[57] ABSTRACT

Banana puree is heated with direct steam injection. A lower pressure zone is used to remove seeds and fiber while partially reducing the temperature of the puree. Thereafter, air and water vapor are removed from the puree prior to cooling in heat exchangers and the resulting product stored.

5 Claims, No Drawings

BANANA PROCESSING

This is a Continuation of application Ser. No. 958,752, filed Nov. 8, 1978, now abandoned.

BACKGROUND OF THE INVENTION

Banana puree is used in the bakery, ice cream and baby food industries. In many applications, especially in baby food, a puree free of seeds, i.e., the dark degenerated ovule which occur within the edible flesh of the banana fruit, is especially desirable.

Furthermore, it is also desirable to avoid the product discoloration caused by the natural enzyme, banana polyphenoloxidase, reacting with various diphenolic compounds in the presence of air. Discoloration also is known to result from the reaction between metals such as tin or zinc and "peel rag", a term used to describe the vascular bundles loosely attached to the banana skin but often left on the peeled fruit.

Banana puree has been traditionally produced by pulping fresh ripe banana fruit, removing the air therefrom, and flash sterilizing the pulped fruit, followed by immediate rapid cooling to prevent the aforementioned discoloration and flavor degradation. Such conventional methods involve fine grinding to reduce the size of the seeds and peel rag, an operation that makes such impurities difficult to remove later.

Another method includes the use of a finisher prior to deaeration. However, in order to protect the color, the bananas are acidified with citric acid and antioxidants such as ascorbic acid, or sulfur dioxide is added. In general, acidified bananas do not have a typical fresh banana flavor.

Still further, U.S. Pat. No. 2,507,564 discloses yet another alternative method of avoiding discoloration of ripe bananas by the control heating of banana puree in the presence of added sugar.

None of the traditional procedures are completely successful in eliminating seeds, peel rag and other fibrous material. Furthermore, such procedures employ relatively expensive heat exchange equipment that is slow to accomplish temperature change, with attendant detrimental effect on product color and flavor.

SUMMARY OF THE INVENTION

It has now been found that by subjecting mashed bananas immediately to direct contact with live steam, and flashing the steam heated banana puree once sufficient sterilization has been accomplished, the preliminary process step of deaerating the mashed bananas, essential in prior art processes, is no longer necessary. In addition, the resulting product has been found to be free of discoloration, off flavors, seeds and fibers, with the further advantage that the banana puree produced is much lighter in overall appearance than purees provided by prior art techniques.

It has been found that unexpected advantages in ease of removal of seeds, peel rag and other fibrous material are obtained when the banana pulp is heated instantly by steam injection under pressure, to a temperature greater than atmospheric boiling temperature, than subsequently flashed by reducing the pressure on the pulp as it enters the finisher. The color of the puree is improved over puree which is produced without removing the seeds, peel rag and other fibrous material. Baby food which has been made using puree manufactued by the methods described by this invention have a more natural yellow color than those made from puree manufactured by conventional methods. It has also been found that the strained puree formed by the process of this invention can be exposed to air for several hours with no visible color change.

In practice the present invention is accomplished by introducing peeled bananas into a sanitary food processing line by suitable means, mashing the bananas by crushing, chopping, grinding or extruding through small holes in a plate, heating the mashed puree to a temperature of about 225° F. or higher by injecting steam into the product line where it can be held at the elevated temperature for a predetermined time. By employing a continuous process, wherein the product is advanced along a holding pipe, the steam/pulp mixture can be held at a predetermined pressure through the use of a back pressure valve or orifice arrangement. Upon leaving the holding pipe the product passes through the back pressure device directly into the finisher which is operated at atmospheric pressure. The pulp is allowed to flash boil within the finisher so as to create a steam atmosphere with a greatly reduced gaseous oxygen content. Seeds, peel rag and other undesirable components are removed from the pulp in the finisher. The finisher can be of any common design utilizing a screen, a paddle or screw for passing the pulp through the finisher and with provisions for removing waste from the screen and collecting the puree that passes through the screen. The resulting strained puree can be further deaerated and cooled with a conventional vacuum deaerator.

The puree subjected to the foregoing process will contain an amount of steam condensate which is directly related to the temperature difference between the raw fruit and the vacuum deaerated product. If desired, additional condensate can be removed by reheating the puree by means of indirect heating and flash boiling or by any of several means of concentrating liquid containing products recognizable by those skilled in the art.

DETAILED DESCRIPTION OF THE INVENTION

To further illustrate the novel process of this invention, the following example is provided. It should be understood that the details thereof are not to be regarded as limitations, as they may be varied, as will be understood by one skilled in the art.

EXAMPLE I

Ripened bananas were washed with water, then hand peeled and placed on a sanitary conveyor belt. From the conveyor belt the bananas were dropped into a hopper fitted with an auger conveyor which forced the bananas into a sanitary pipe connected to a positive displacement pump.

The bananas were then pumped through a plate placed in the pipe, perpendicular to the axis of the pipe and perforated with ¼" holes. Steam was injected into the pipe, causing heating of the product to 250° F. An orifice was placed in the pipe at a sufficient distance from the point of steam injection in order to control the pressure in the pipe to a level greater than 15 pounds per square inch for a time of 40 seconds. The pipe and orifice extended into the cylinder formed by a finisher screen where the product was allowed to return to atmospheric pressure, thereby flashing within the confines of the finisher. A conventional FMC 50 finisher was used that had been fitted with 0.040" screen openings. The finisher speed was adjusted to give desirable product free of seeds and peel rag.

The puree was then pumped to a vacuum tank where the puree was further cooled to 160° F., then pumped to a series of scraped surface heat exchangers cooled with water and refrigerated brine that cooled the puree down to 30° F. The cold puree was filled into fiber containers and placed in a blast freezer, where the temperature was reduced to −10° F.

EXAMPLE II

The puree, recovered from the finisher of Example I, was pumped to a mix tank where citric acid was added to lower the pH to 4.5. The puree was then filled into containers while at a temperature of 190° F., sealed hermetically and thereafter cooled to 100° F. (center temperature) prior to storage.

What is claimed is:

1. In a process for forming a cooked storage-stable banana puree free of seeds from fresh bananas by the steps of peeling, mashing, and heating, followed by cooling and storing, the improvement comprising accomplishing the heating by subjecting the peeled, mashed bananas to be deseeded to contact with live steam at a temperature greater than the atmospheric boiling temperature of water for a time sufficient to accomplish cooking of the mashed bananas and thereafter subjecting the resulting cooked mashed bananas to flashing in a finisher having a screen so as to form a puree free of discoloration and substantially free of seeds, peel rag and other naturally occurring fibrous materials, said puree then being cooled prior to storing.

2. A process in accordance with claim 1 wherein the contact with live steam is at elevated pressure.

3. A process in accordance with claim 2 wherein the elevated pressure is in the range of 15–25 psig.

4. A process in accordance with claim 1 wherein the contact with live steam is for a time sufficient to elevate the temperature to about 250° F.

5. A process in accordance with claim 1 wherein the step of treating the peeled, mashed bananas to be deseeded with live steam is immediately followed by a pressure reduction to cause product flashing.

* * * * *